(12) United States Patent
Masuoka et al.

(10) Patent No.: US 10,578,002 B2
(45) Date of Patent: Mar. 3, 2020

(54) POWERTRAIN FOR VEHICLE

(71) Applicant: MAZDA MOTOR CORPORATION, Hiroshima (JP)

(72) Inventors: Taichi Masuoka, Hiroshima (JP); Yasunori Kanada, Hiroshima (JP); Keishi Kitabatake, Hiroshima (JP); Taku Kuramashi, Hatsukaichi (JP); Yuji Torigoe, Hatsukaichi (JP); Shoko Suzuki, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 37 days.

(21) Appl. No.: 16/103,713

(22) Filed: Aug. 14, 2018

(65) Prior Publication Data

US 2019/0063300 A1    Feb. 28, 2019

(30) Foreign Application Priority Data

Aug. 24, 2017   (JP) .................................. 2017-161498

(51) Int. Cl.
| | | |
|---|---|---|
| *F01N 13/18* | (2010.01) | |
| *B60K 13/04* | (2006.01) | |
| *F01N 13/10* | (2010.01) | |

(52) U.S. Cl.
CPC .......... *F01N 13/1811* (2013.01); *B60K 13/04* (2013.01); *F01N 13/10* (2013.01); *F01N 13/1822* (2013.01); *F01N 13/1872* (2013.01); *F01N 2340/04* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,863,154 | B2 * | 3/2005 | Uegane | ................... F01N 13/08 181/207 |
| 8,690,115 | B2 * | 4/2014 | Rodecker | ............ F01N 13/1822 248/617 |
| 8,910,472 | B2 * | 12/2014 | Takahashi | ............... F01N 13/14 180/291 |
| 9,255,517 | B2 * | 2/2016 | Nishimura | .......... F01N 13/1805 |
| 9,719,403 | B2 * | 8/2017 | Yano | ................... F01N 13/1822 |
| 9,850,800 | B2 * | 12/2017 | Jang | .................... F01N 13/1822 |
| 2006/0185924 | A1 | 8/2006 | Kobayashi et al. | |

(Continued)

FOREIGN PATENT DOCUMENTS

| | | |
|---|---|---|
| DE | 11 2014 002 042 T5 | 1/2016 |
| JP | H05-098959 A | 4/1993 |

(Continued)

*Primary Examiner* — Binh Q Tran
(74) *Attorney, Agent, or Firm* — Studebaker & Brackett PC

(57) ABSTRACT

Provided is a powertrain for a vehicle in which an exhaust purifier is utilized as a dynamic damper. The powertrain includes an engine, and a transmission linked to the engine. The engine has an exhaust purification system containing a GPF device for purifying an exhaust gas. The exhaust purification system is disposed along a rear external surface of a cylinder head. The exhaust purification system is supported via a first support on the engine. A vertical side portion of the exhaust purification system is located downstream of the first support in a flow direction of an exhaust gas, extending in a direction away from the external surface.

6 Claims, 15 Drawing Sheets

(56) References Cited

U.S. PATENT DOCUMENTS

| | | |
|---|---|---|
| 2006/0266891 A1 | 11/2006 | Stammel et al. |
| 2012/0198838 A1 | 8/2012 | Bruck et al. |
| 2014/0090364 A1 | 4/2014 | Bruck et al. |
| 2016/0076431 A1 | 3/2016 | Kuramashi et al. |
| 2016/0121711 A1 | 5/2016 | Yano et al. |
| 2017/0022875 A1 | 1/2017 | Jang |

FOREIGN PATENT DOCUMENTS

| | | |
|---|---|---|
| JP | H0735149 U | 6/1995 |
| JP | 2004-150292 A | 5/2004 |
| JP | 2005-219709 A | 8/2005 |
| JP | 2005-320907 A | 11/2005 |
| JP | 2006-009753 A | 1/2006 |
| JP | 2006-070712 A | 3/2006 |
| JP | 2012-529592 A | 11/2012 |
| JP | 2014-211112 A | 11/2014 |
| JP | 2016-088159 A | 5/2016 |
| JP | 2017-115672 A | 6/2017 |
| WO | 2004/085188 A1 | 10/2004 |

\* cited by examiner

POWERTRAIN FOR VEHICLE

CROSS-REFERENCE TO RELATED APPLICATION

This application claims priority to Japanese Patent Application No. 2017-161498 filed on Aug. 24, 2017, the entire disclosure of which is incorporated by reference herein.

BACKGROUND

The technology disclosed herein relates to powertrains for vehicles. Japanese Unexamined Patent Publication No. 2006-9753 describes an example engine included in a powertrain for a vehicle. Specifically, Japanese Unexamined Patent Publication No. 2006-9753 describes a dynamic damper that is configured by spherical joints being provided in front of and behind purifiers (catalyst) for purifying an exhaust gas in an exhaust system for an engine.

SUMMARY

Incidentally, the layout of an exhaust purifier containing the purifier as described in Japanese Unexamined Patent Publication No. 2006-9753 above may be designed such that the exhaust purifier is utilized as a dynamic damper.

With the above problem in mind, the technology disclosed herein has been made. The present disclosure describes a powertrain for a vehicle in which an exhaust purifier is utilized as a dynamic damper.

The technology disclosed herein features a powertrain for a vehicle.

The powertrain for a vehicle includes a body including an engine, and a transmission linked to one side of the engine in an engine output axis direction of the engine, an exhaust purifier disposed on or near an exhaust side surface of the engine, and a first support having a first end and a second end opposite to the first end, the first end being attached to the body, the first support extending from the first end in a first direction, and the second end being attached to the exhaust purifier at an attachment location on the exhaust purifier. The exhaust purifier includes a tube-shape extending in a direction away from the exhaust side surface in an air intake-exhaust direction. The exhaust purifier is supported via the first support on the body, and a downstream side of the exhaust purifier in an exhaust gas flow direction from the attachment location extends in a direction away from the engine. The first support is configured to have a support stiffness smaller in a vehicle horizontal direction than in a vehicle height direction so that the tube-shape is configured to vibrate in the horizontal direction.

As used herein, the term "horizontal direction" refers to a direction that is parallel to the horizontal plane.

With this feature, the exhaust purifier is supported via the support on the unit body. In addition, a portion of the exhaust purifier that is located downstream of the support extends in a direction away from the engine. As a result, the exhaust purifier functions as a pendulum, where the portion of the exhaust purifier that is located downstream of the support swings with the support being a pivot. This allows the exhaust purifier to be utilized as a dynamic damper.

A typical powertrain for a vehicle vibrates in various vibration modes during operation. Among the vibration modes is a torsional vibration that occurs in the horizontal plane with a portion where the engine and the transmission are fastened together being a node.

In order to reduce the torsional vibration, the stiffness of the portion where the engine and the transmission are fastened together may be enhanced by increasing the fastening force of a bolt to that fastening portion, for example.

However, in the above case, the wall thickness of the fastening portion is required to have a great thickness in order to withstand the enhanced fastening force, unfavorably resulting in an increase in the weight of the fastening portion.

In contrast, in the above configuration, the support has a support stiffness that is smaller in the horizontal direction than in the vehicle height direction, and therefore, is allowed to undergo flexural deformation in the horizontal direction. As a result, for example, when the torsional vibration occurs, the exhaust purifier is allowed to swing in the horizontal direction. Therefore, the exhaust purifier can be utilized as a dynamic damper for reducing the torsional vibration.

The first support may be configured as a plate-shaped bracket extending in the first direction, and the first direction is the horizontal direction. A bend flexurally deformable in the horizontal direction may be formed on the first support at a location between the first end and the second end of the first support.

This feature is advantageous in allowing the exhaust purifier to be utilized as a dynamic damper for reducing the torsional vibration.

The exhaust purifier may be supported via a second support on the body. The second support is configured to limit vibration of the exhaust purifier in the vehicle height direction.

With this feature, the second support reduces a vibration in the vehicle height direction of the exhaust purifier. As a result, a vibration that is not necessary for allowing the exhaust purifier to be utilized as a dynamic damper for reducing the torsional vibration, is reduced, which is advantageous in ensuring the durability of the exhaust purifier.

The powertrain may include an output, and an auxiliary attached to the engine at a location below the exhaust purifier in the vehicle height direction, the auxiliary being configured to be operated by the output. The auxiliary may be attached to the engine such that the auxiliary is configured to vibrate in the horizontal direction.

The exhaust purifier is typically disposed above the powertrain in the height direction (specifically, at a position near the cylinder head of the engine). In this case, as described above, when the exhaust purifier is utilized as a dynamic damper, the torsional vibration is reduced in an upper portion of the powertrain, but the torsional vibration is not likely to be sufficiently reduced in a lower portion of the powertrain (e.g., a portion extending from the cylinder block to the oil pan of the engine).

With the above feature, not only the exhaust purifier, but also the auxiliary device attached to the engine, are allowed to vibrate in the horizontal direction. In this case, the auxiliary device can be utilized as a second dynamic damper. As described above, the auxiliary device is located below the exhaust purifier, and therefore, the torsional vibration can also be reduced in the lower portion of the powertrain.

Thus, the torsional vibration can be reduced over an entire region extending from the upper portion to the lower portion of the powertrain for a vehicle.

The powertrain may include a cavity positioned in the exhaust purifier at a downstream location in the exhaust gas flow direction from the attachment location, and a purifier serially positioned in the exhaust purifier with respect to the cavity at a location that is downstream from the cavity in the exhaust gas flow direction.

With this feature, in the portion of the exhaust purifier extending in a direction away from one surface of the engine, the hollow cavity portion and the purifier are disposed serially, with the hollow cavity portion being located upstream of the purifier. The purifier is typically configured as a heavy-weight object such as a catalyst. Therefore, if the purifier is disposed downstream of the cavity portion, the moment of inertia of the entire exhaust purifier can be increased. This is advantageous in allowing the exhaust purifier to be utilized as a dynamic damper.

The powertrain may include an exhaust manifold positioned between the exhaust purifier and the engine, the exhaust purifier coupled to the engine by the exhaust manifold. The exhaust manifold may have branch passages coupled to respective cylinders of the engine, and a merging structure in which the branch passages merge together, and the merging structure may be coupled to the exhaust purifier. The merging structure may be configured to have a stiffness smaller in the horizontal direction than a stiffness in the vehicle height direction.

With this feature, the merging structure supported via the branch passage on the engine functions as a flat spring flexurally deformable in the horizontal direction. This is advantageous in allowing the exhaust purifier to be utilized as a dynamic damper.

As described above, in the powertrain for a vehicle, the exhaust purifier can be utilized as a dynamic damper.

DETAILED DESCRIPTION

Figure 1:
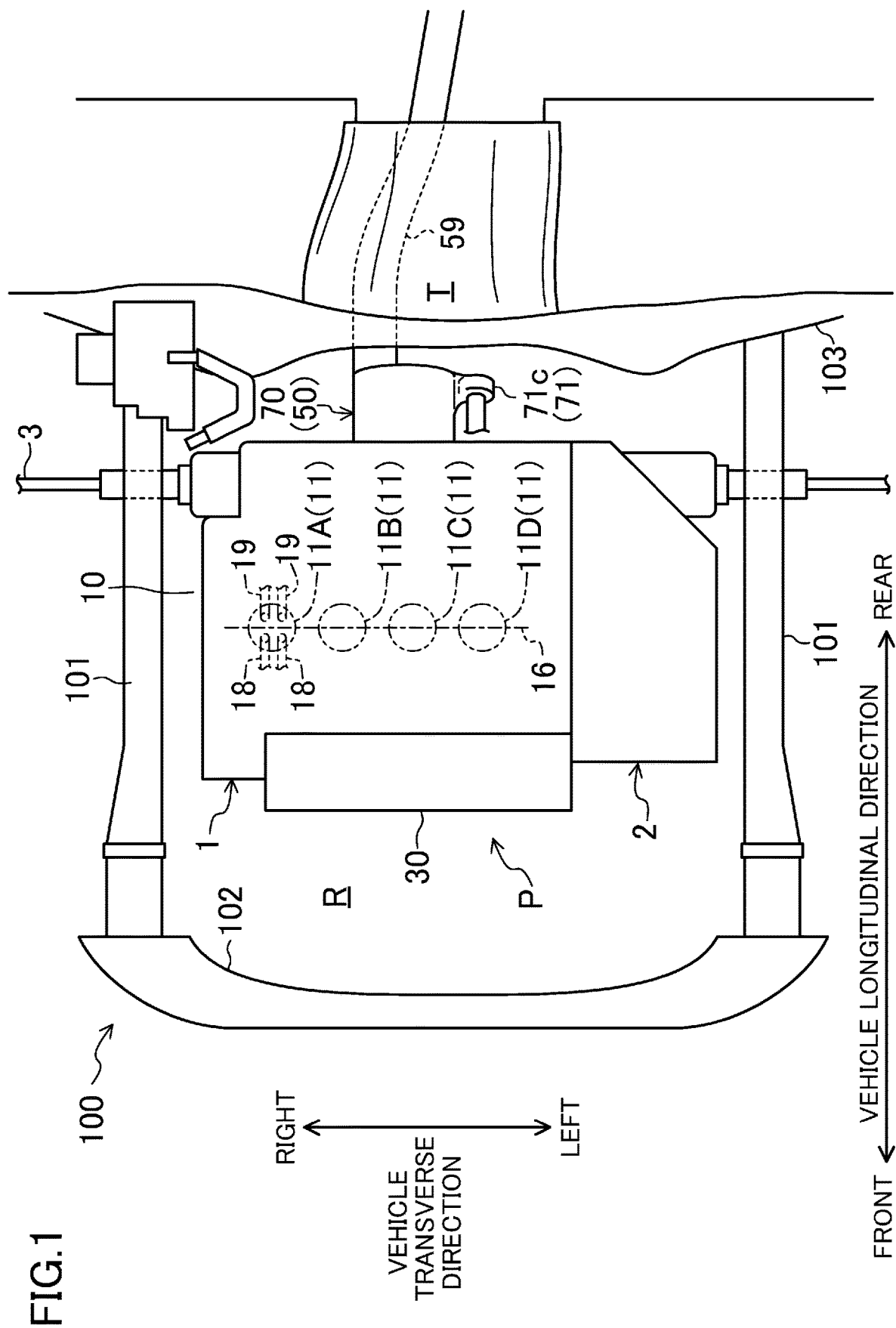
FIG. 1 is a diagram schematically showing a vehicle including a powertrain.
Figure 2:
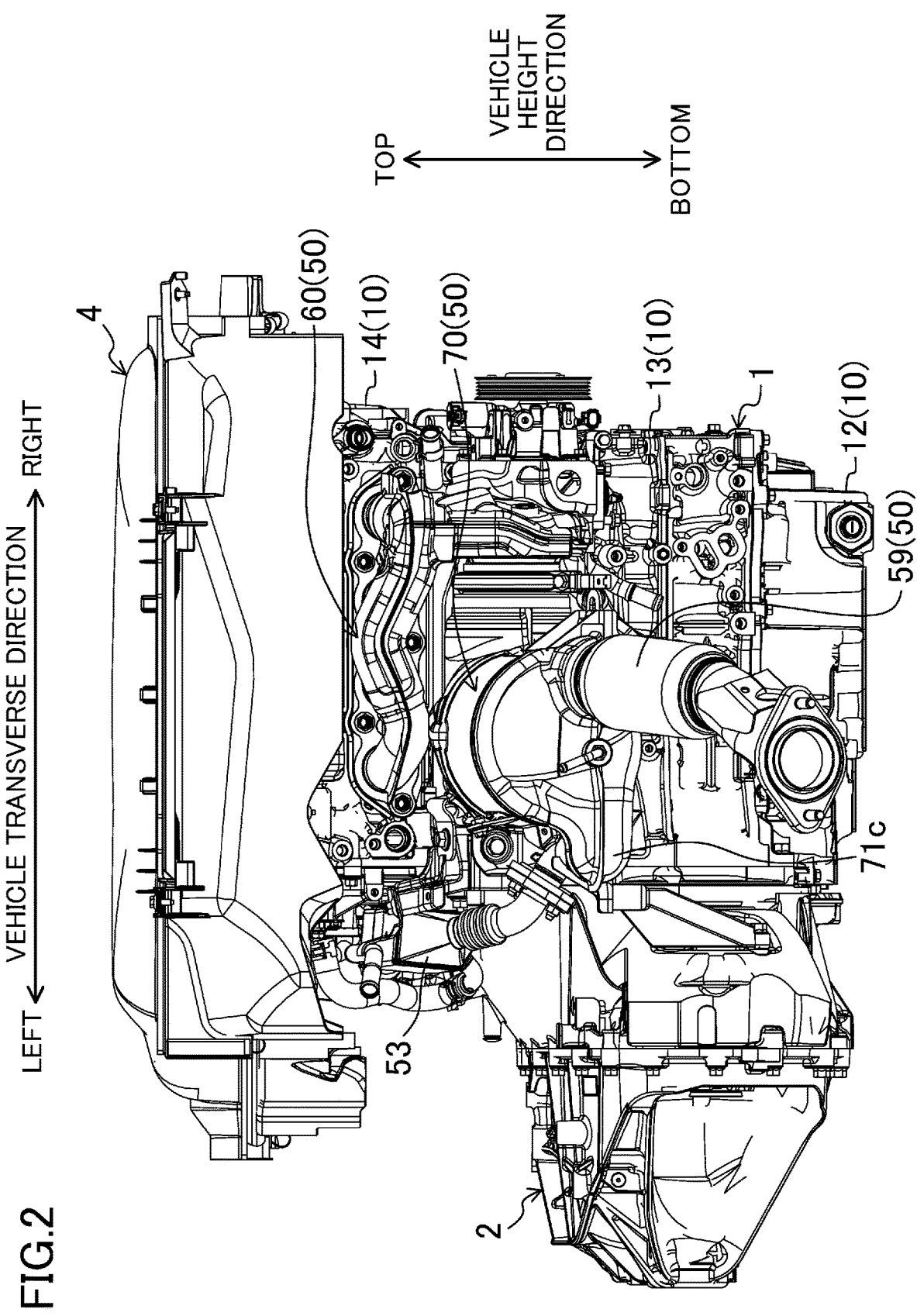
FIG. 2 is a diagram showing a powertrain as viewed behind.
Figure 3:
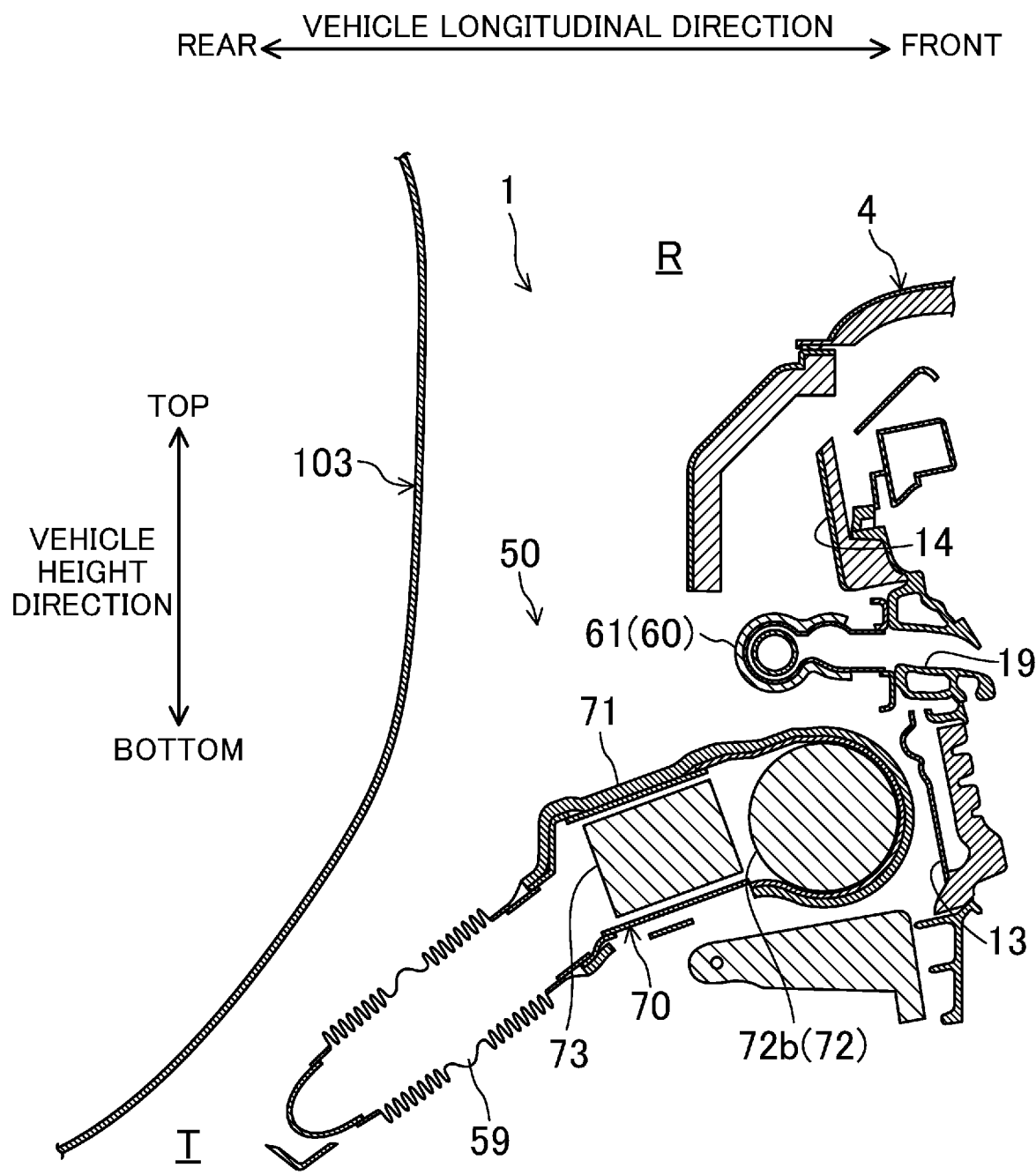
FIG. 3 is a vertical cross-sectional view showing a configuration of an exhaust passage.

Embodiments of a powertrain for a vehicle will now be described in detail with reference to the accompanying drawings. Note that the descriptions below are only for illustrative purposes. FIG. 1 is a diagram showing a front portion of an automobile (vehicle) 100 including a powertrain P for a vehicle disclosed herein (a powertrain for a vehicle is hereinafter referred to as a "powertrain"). FIG. 2 is a diagram showing the powertrain P as viewed behind. FIG. 3 is a vertical cross-sectional view showing a configuration of an exhaust passage 50.

(Overview of Configuration of Powertrain)

Firstly, a configuration of the powertrain P will be outlined.

The powertrain P includes an engine 1 and a transmission 2 linked to the engine 1. The engine 1 is, for example, a four-stroke gasoline engine that is configured such that it can undergo both spark ignited combustion and compression ignition combustion. Meanwhile, the transmission 2, which is, for example, a manual transmission, transfers the output of the engine 1 to a drive shaft 3, which is then driven to rotate. Note that the engine 1 and the transmission 2 constitute a "unit body" in this embodiment.

The automobile 100 equipped with the powertrain P is a front-engine, front-wheel-drive four-wheel car. Specifically, the powertrain P, the drive shaft 3, and drive wheels (i.e., the front wheels) linked to the drive shaft 3, are all disposed in a front portion of the automobile 100.

The vehicle body of the automobile 100 includes a plurality of frames. In particular, a front vehicle body includes a pair of left and right side frames 101 that are provided on opposite sides in the vehicle transverse direction, extending in the longitudinal direction of the automobile 100, and a front frame 102 that is supported by the pair of side frames 101, spanning between front ends of the side frames 101.

The front portion of the vehicle body is partitioned to provide an engine room R, in which the powertrain P is mounted. The engine room R is formed by a bonnet (not shown) that is disposed above the powertrain P, and becomes higher from front to rear, and a dash panel 103 that is disposed behind the engine 1, and separates the engine room R from a cabin that accommodates passengers, as shown in FIG. 1. Note that the dash panel 103 is disposed behind the engine 1, and separates a rear portion of the engine room R, and in this sense, is illustrated as a "partition wall." The partition wall is not limited to the dash panel 103, and may be formed by at least one of a plurality of members such as a cowling (not shown) located above the dash panel 103, and a floor panel (not shown).

As shown in FIG. 1, a conduit portion T that extends from the dash panel 103 rearward in the vehicle longitudinal direction is provided at a middle portion in the vehicle transverse direction of the dash panel 103. In the conduit portion T, a duct for guiding an exhaust gas to a muffler is disposed, and natural air flows out of the engine room R when the vehicle is running.

The engine 1 includes four cylinders 11 arranged in a line. The four cylinders 11 are arranged side by side in the vehicle transverse direction, i.e., the engine 11 is the so-called inline four-cylinder transverse engine. Therefore, in this embodiment, the engine longitudinal direction in which the four cylinders 11 are arranged (cylinder array direction) is substantially the same as the vehicle transverse direction, and the engine transverse direction is substantially the same as the vehicle longitudinal direction.

Note that, in an inline multi-cylinder engine, the cylinder array direction is the same as the central axis direction (engine output axis direction) of a crankshaft 16 as an engine output axis. In the description that follows, these directions are all referred to as a "cylinder array direction (or vehicle transverse direction)."

Unless otherwise specified, the terms "front," "forward," "in front of," etc., refers to one of two opposite directions, sides, or positions in the engine transverse direction (i.e., the front in the vehicle longitudinal direction), the terms "rear," "rearward," "behind," etc., refers to the other in the engine transverse direction (i.e., the rear in the vehicle longitudinal direction), the terms "left," "leftward," etc., refers to one of two opposite directions, sides, or positions in the engine longitudinal direction (cylinder array direction) (i.e., the left in the vehicle transverse direction, the rear of the engine, and the side of the powertrain P on which the transmission 2 is located), and the terms "right," "rightward," etc., refers to the other in the engine longitudinal direction (cylinder array direction) (i.e., the right in the vehicle transverse direction, the front of the engine, and the side of the powertrain P on which the engine 1 is located).

In the description that follows, the terms "upper," "upward," "top," etc., refers to one of two opposite directions, sides, or positions in the vehicle height direction that is above the powertrain P when the powertrain P is mounted in the automobile 100 (also hereinafter referred to as a "mounted-in-vehicle state"), and the terms "lower," "downward," "bottom," etc., refers to the other in the vehicle height direction below the powertrain P in the mounted-in-vehicle state.

Meanwhile, the transmission 2 is attached to a left side surface of the engine 1, and is adjacent to the engine 1 in the cylinder array direction. As shown in FIG. 2, a dimension in the height direction of the transmission 2 is shorter than that of the engine 1.

An engine cover 4 for covering the engine 1 is provided above the engine 1 (specifically, above a cylinder head 14). As shown in FIG. 3, a rear end of the engine cover 4 is inclined or oriented diagonally downward and rearward so that natural air flowing along a lower surface of the rear end is guided to the exhaust passage 50 (specifically, the exhaust manifold 60).

(Overview of Configuration of Engine)

Next, a configuration of the engine 1 included in the powertrain P will be outlined. In this example configuration, the engine 1 of the front intake/rear exhaust type. Specifically, the engine 1 includes an engine body 10 having four cylinders 11, an air intake passage 30 that is disposed in front of the engine body 10, and is in communication with each cylinder 11 through air intake ports 18, and an exhaust passage 50 that is disposed behind the engine body 10, and is in communication with each cylinder 11 through exhaust ports 19.

The air intake passage 30 allows a gas (fresh air) introduced from the outside to be passed therethrough so that the gas is supplied to each cylinder 11 of the engine body 10. In this example configuration, the air intake passage 30 forms, in front of the engine body 10, an air intake system that is a combination of a plurality of passages for introducing a gas and devices such as a supercharger and an intercooler.

The engine body 10 is configured such that the combustion of an air-fuel mixture of a gas supplied from the air intake passage 30 and a fuel occurs in each cylinder 11. Specifically, the engine body 10 has an oil pan 12, a cylinder block 13 attached on the oil pan 12, and a cylinder head 14 placed on the cylinder block 13, in that order with the oil pan 12 being the lowest one of them. Power obtained from the combustion of an air-fuel mixture is output through the crankshaft 16 provided in the cylinder block 13.

The above four cylinders 11 are formed in the cylinder block 13. The four cylinders 11 are arranged side by side in the central axis direction of the crankshaft 16 (i.e., the cylinder array direction). The four cylinders 11 are each in the shape of a cylinder. Each cylinder 11 has a center axis (hereinafter referred to as a "cylinder axis"). The center axes of the four cylinders 11 are parallel to each other and perpendicular to the cylinder array direction. The four cylinders 11 shown in FIG. 1 may hereinafter be referred to as the "first cylinder 11A," "second cylinder 11B," "third cylinder 11C," and "fourth cylinder 11D," respectively, in that order in the cylinder array direction with the first cylinder 11A being the rightmost one of them.

In the cylinder head 14, two exhaust ports 19 are formed for each cylinder 11. The two exhaust ports 19 are in communication with the corresponding cylinder 11.

The exhaust passage 50 is a passage through which an exhaust gas emitted from the engine body 10 due to the combustion of an air-fuel mixture flows. Specifically, the exhaust passage 50 is disposed behind the engine body 10, and is in communication with the exhaust ports 19 of each cylinder 11. In the exhaust passage 50, an exhaust manifold 60 and an exhaust purification system 70 are arranged in that order in the direction that an exhaust gas flows, with the exhaust manifold 60 being located upstream of the exhaust purification system 70. The exhaust purification system 70 contains a gasoline particulate filter (GPF) device 73 that functions as a gasoline particulate filter for purifying an exhaust gas. Note that the exhaust purification system 70 is an example "exhaust purifier," and the GPF device 73 is an example "purifier."

In this example configuration, the exhaust passage 50 forms an exhaust system that is a combination of a plurality of passages for guiding a gas such as the exhaust manifold 60, and devices such as the exhaust purification system 70.

Referring back to FIG. 1, the air intake passage 30 and the exhaust passage 50 are coupled to a front surface and rear surface (an external surface 14a described below), respectively, of the engine body 10. An EGR passage 52 that couples the air intake passage 30 and the exhaust passage 50 together to form an external EGR system is provided outside the engine body 10 (to the left of the engine body 10 in FIG. 2). The EGR passage 52 is for causing a portion of a combusted gas to flow back into the air intake passage 30. An upstream end of the EGR passage 52 is coupled to a portion of the exhaust purification system 70 that is located downstream of the GPF device 73. A downstream end of the EGR passage 52 is coupled to a portion of the air intake passage 30 that is located downstream of a throttle valve (not shown).

A water-cooling EGR cooler 53 is provided in the EGR passage 52. The EGR cooler 53 is configured to cool a combusted gas. The EGR cooler 53 cools an external EGR gas, and proportionately receives heat from the external EGR gas. Therefore, the EGR cooler 53 that has received heat can be used as a heat source.

(Configuration of Exhaust Passage)

Next, a configuration of the exhaust passage 50 of the engine 1 will be described in detail.

Figure 4:
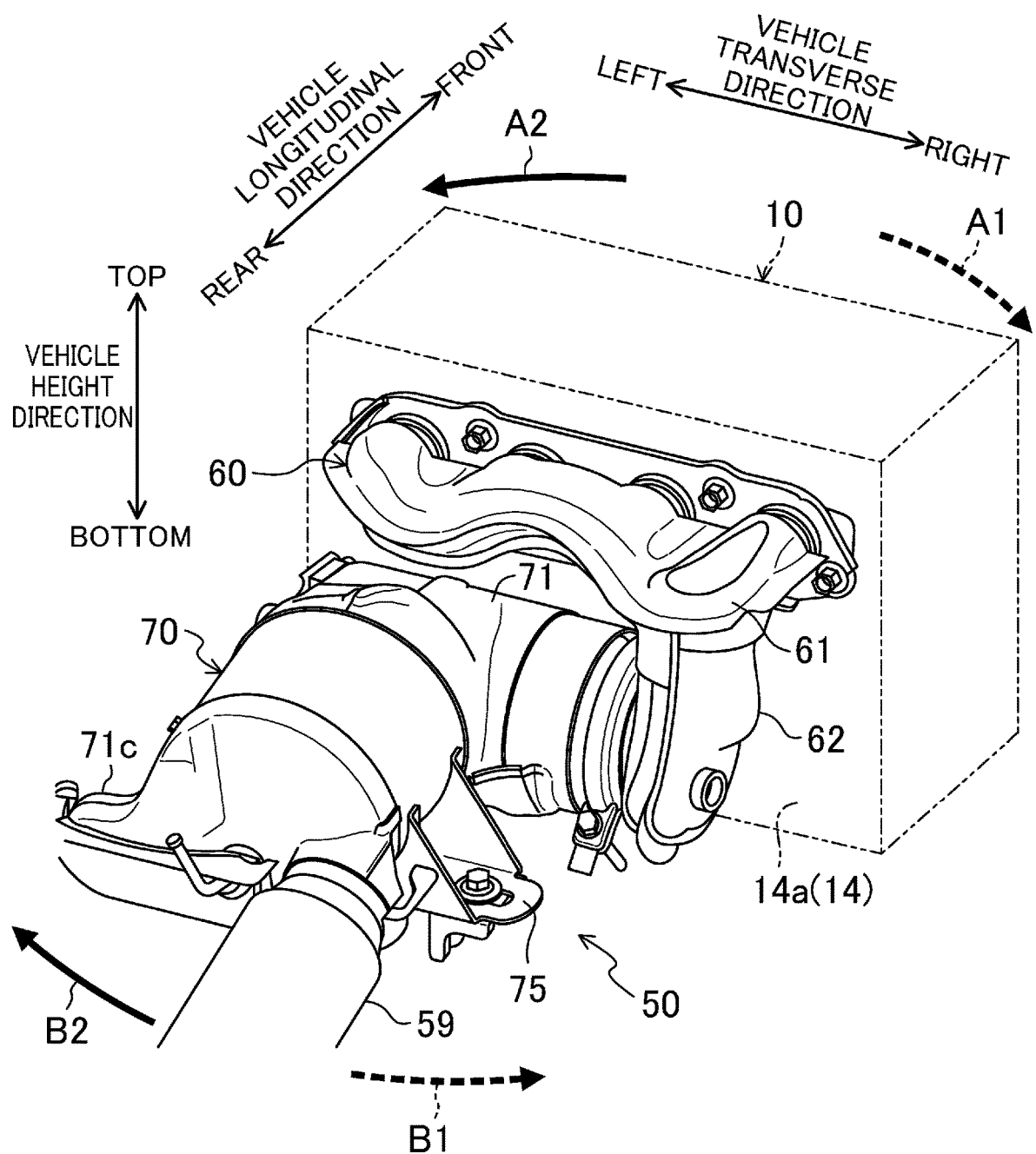
FIG. 4 is a perspective view showing an entire configuration of an exhaust passage.
Figure 5:
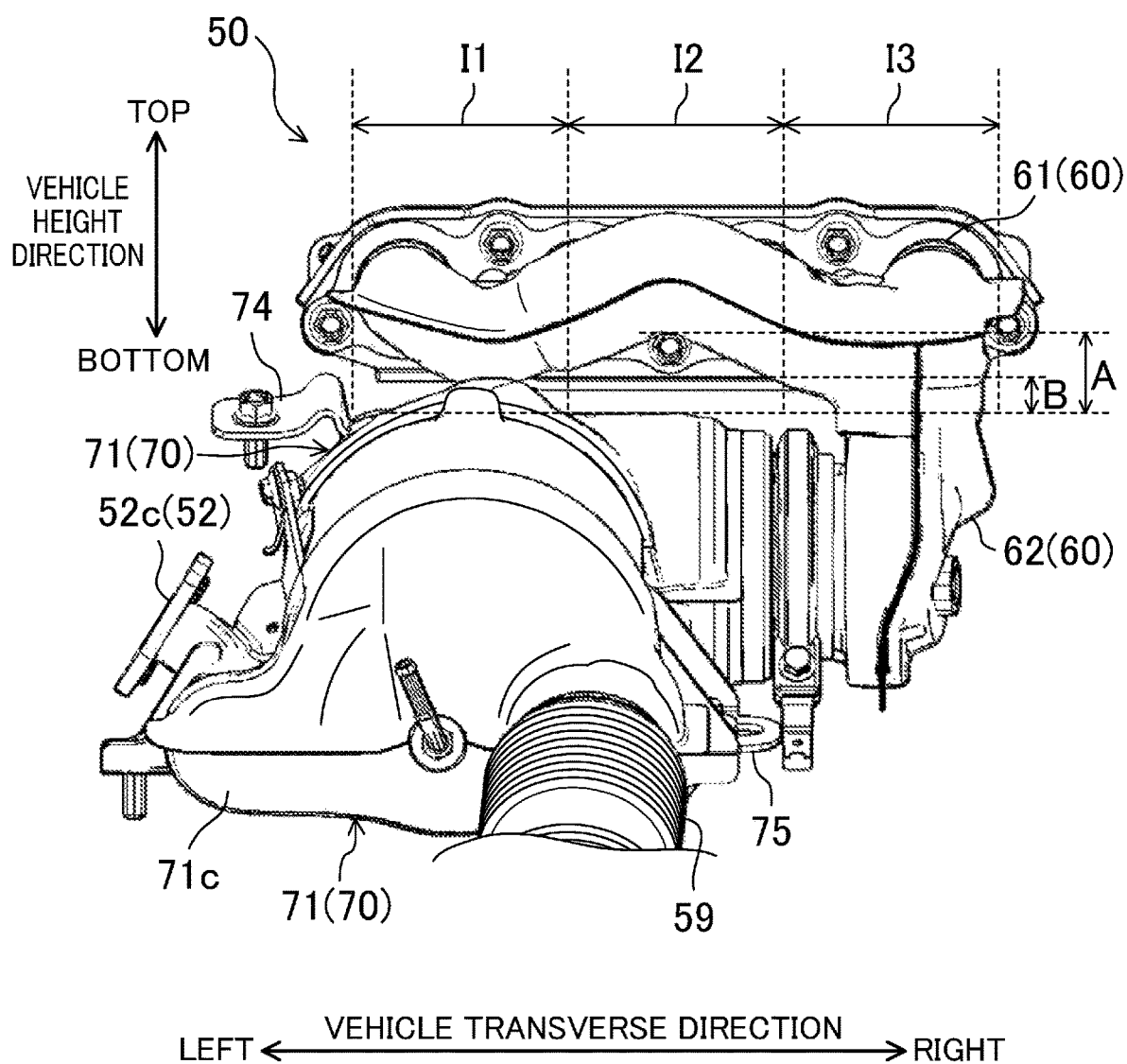
FIG. 5 is a diagram showing an exhaust passage as viewed from behind.
Figure 6:
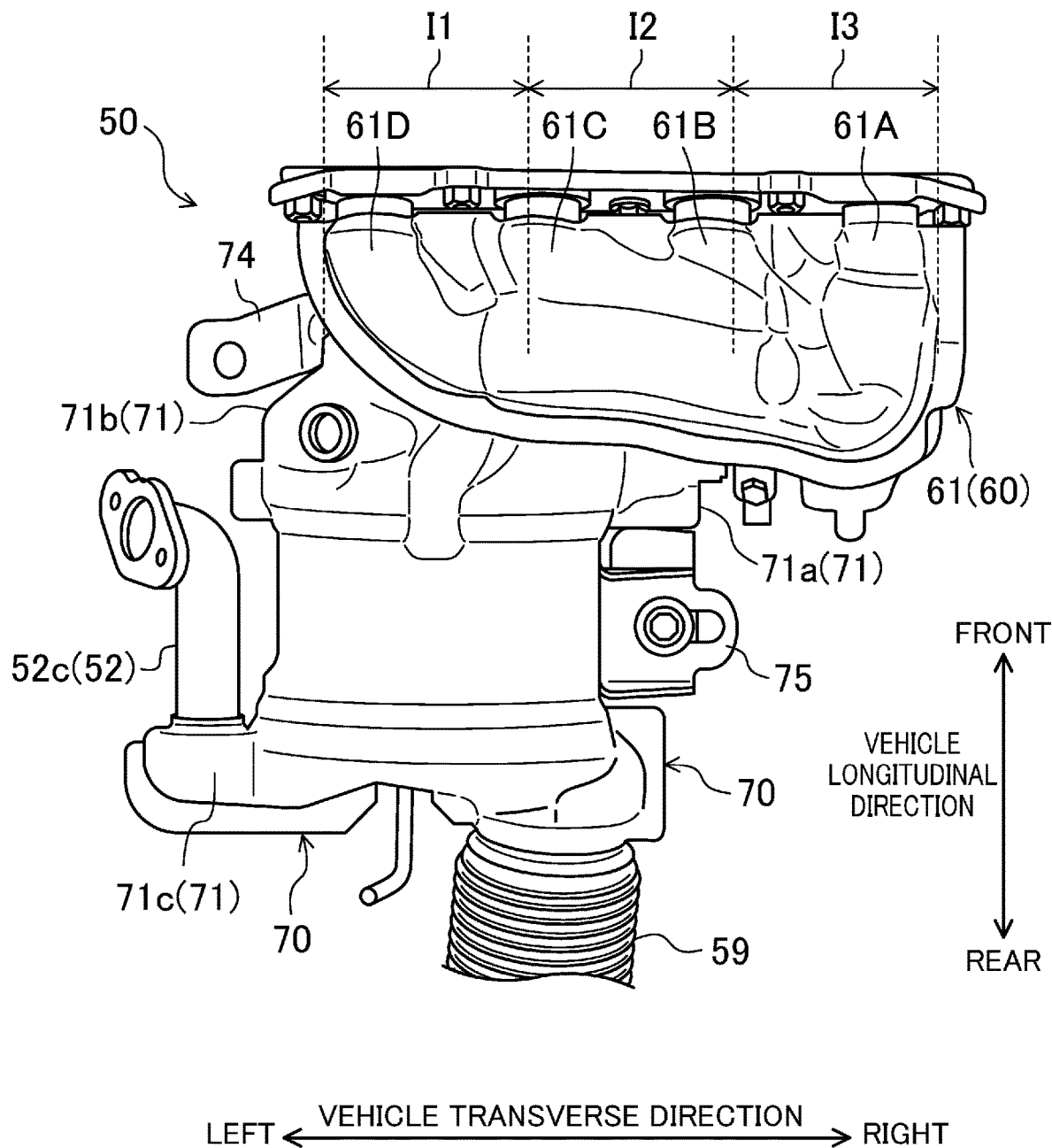
FIG. 6 is a diagram showing an exhaust passage as viewed from above.
Figure 7:
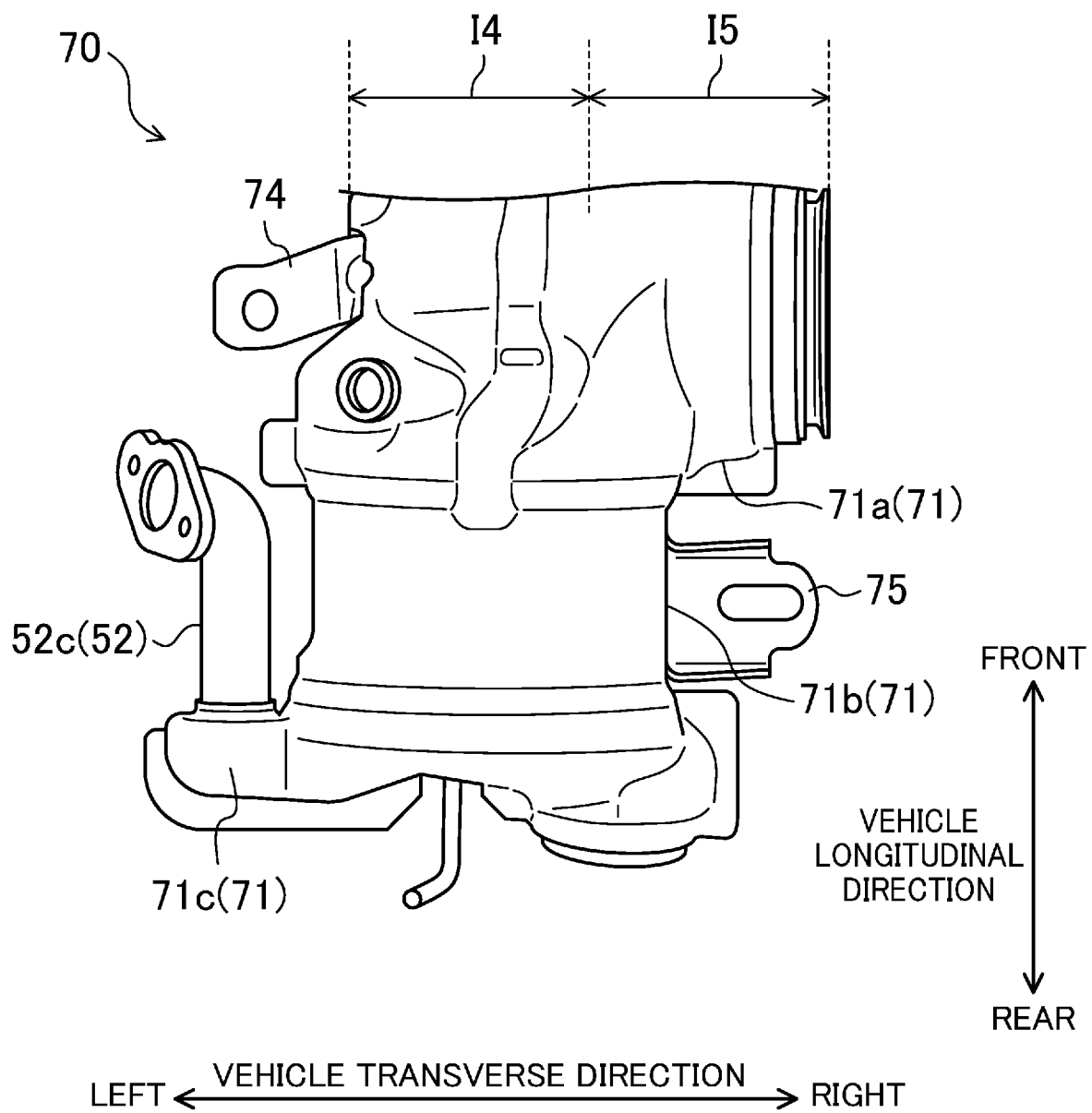
FIG. 7 is a diagram showing an exhaust purification system as viewed from above.
Figure 8:
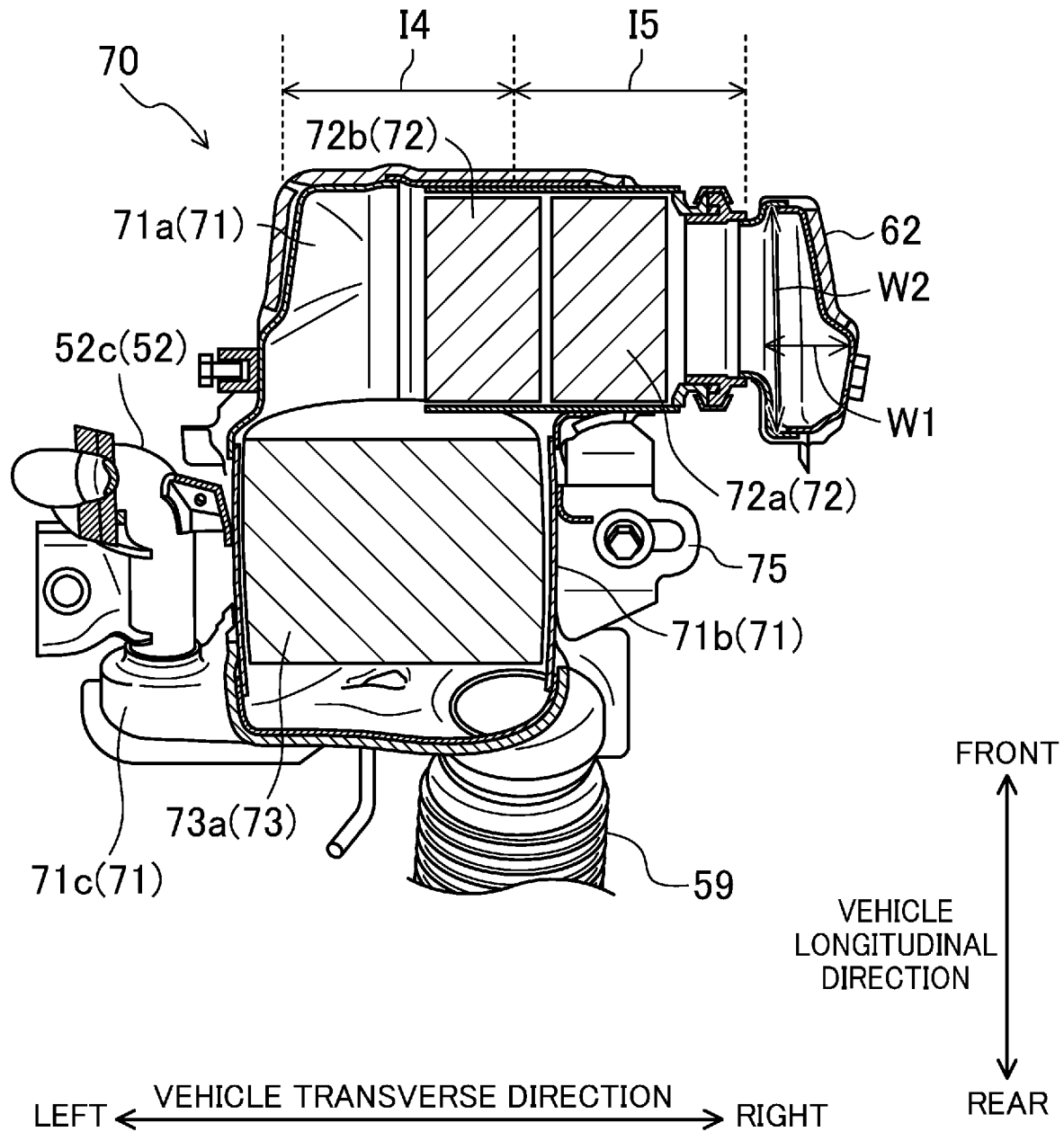
FIG. 8 is a cross-sectional view showing an internal structure of an exhaust purification system.
Figure 9:
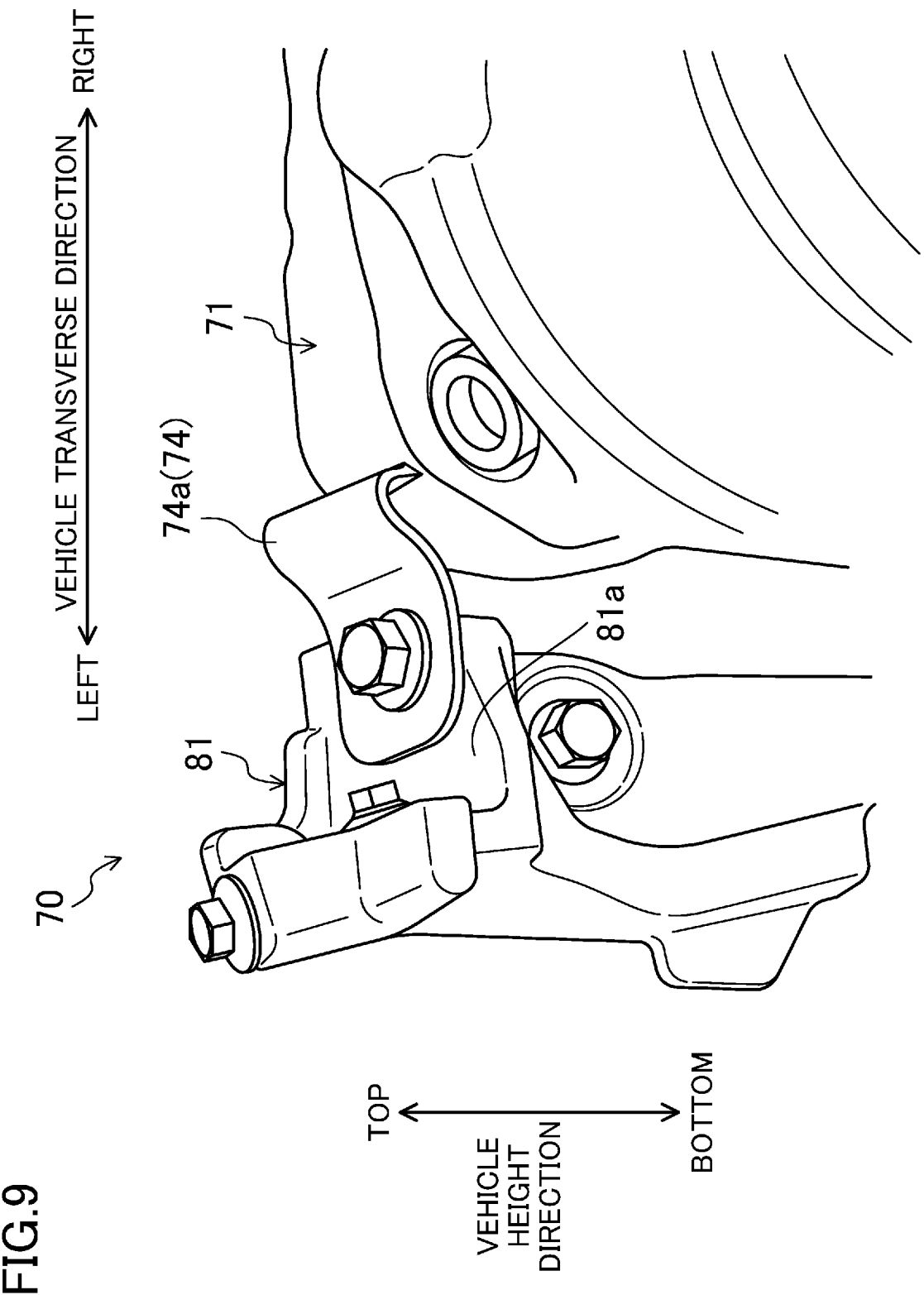
FIG. 9 is a perspective view showing a first support for an exhaust purification system as viewed diagonally from above.
Figure 10:
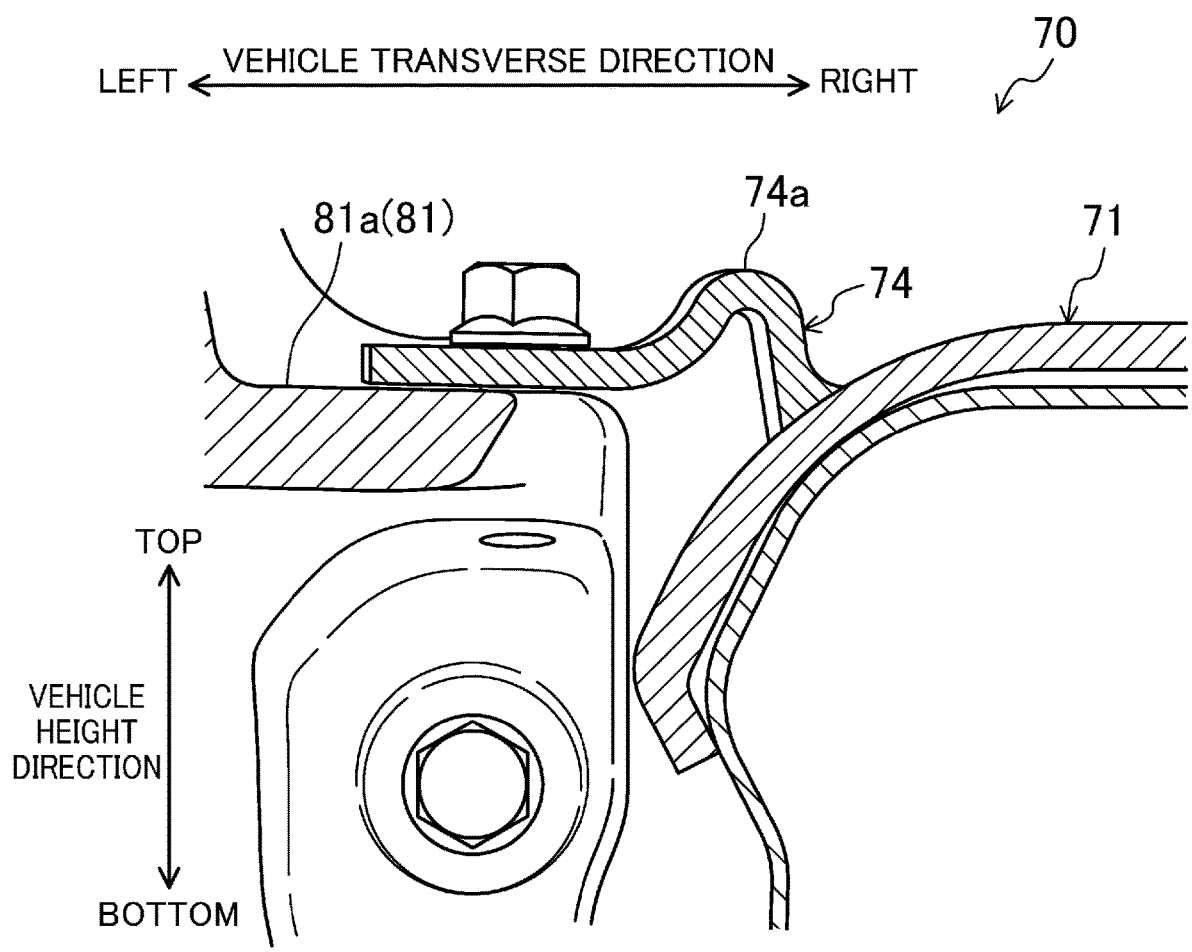
FIG. 10 is a cross-sectional view showing a support structure provided by a first support.
Figure 11:
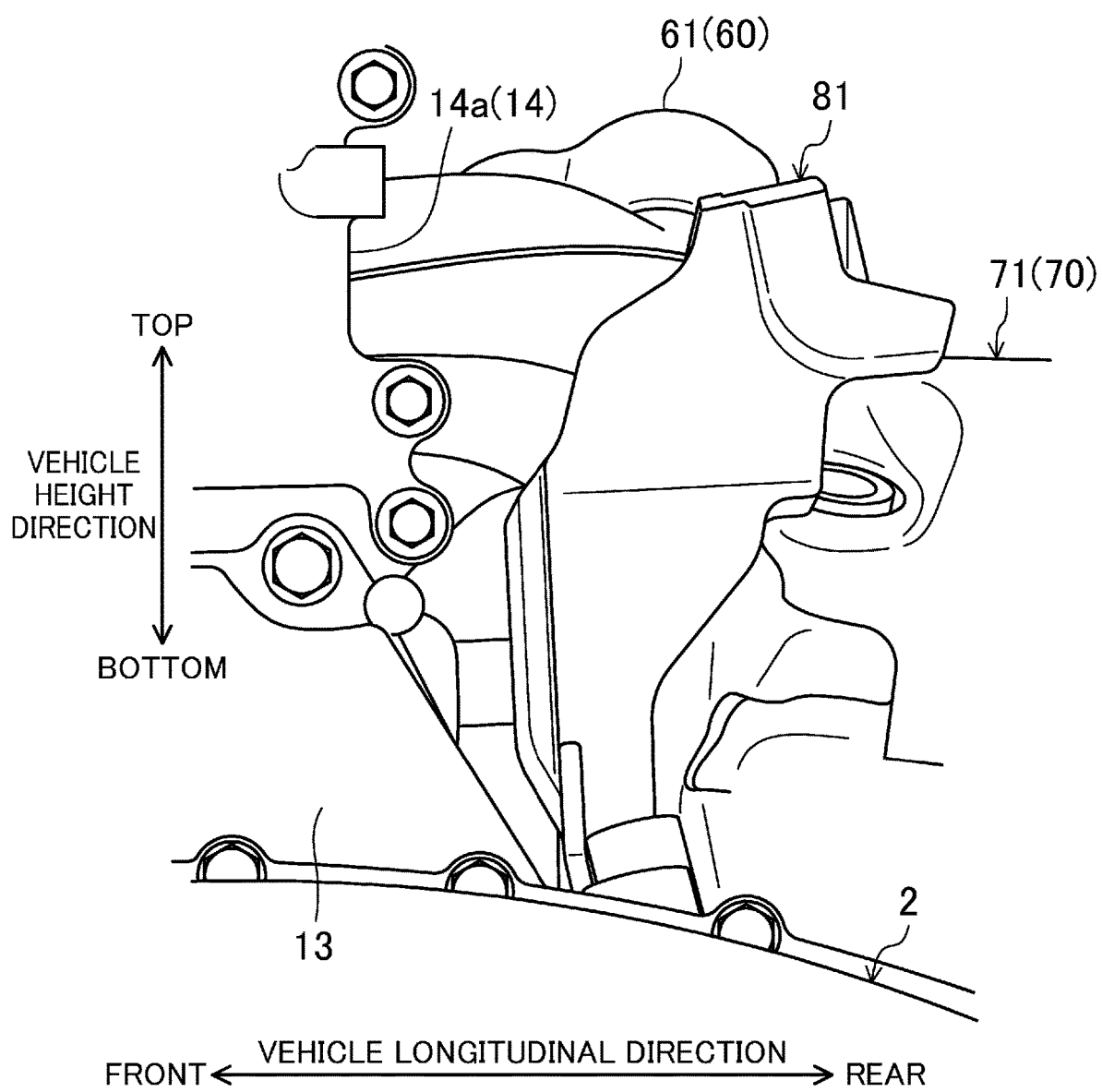
FIG. 11 is a diagram showing a first attachment member for a first support as viewed from the left.
Figure 12:
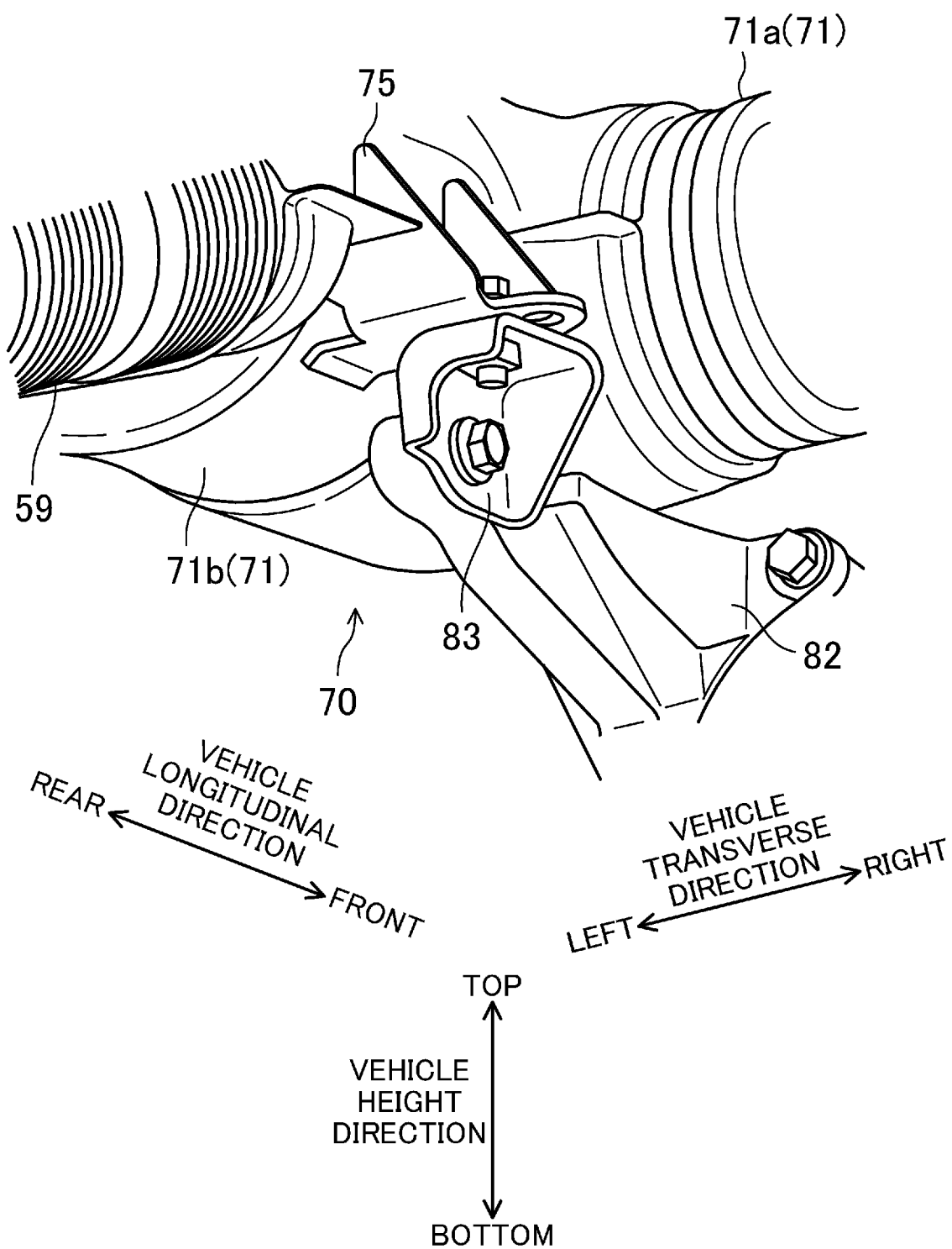
FIG. 12 is a perspective view showing a second support for an exhaust purification system as viewed diagonally from below.
Figure 13:
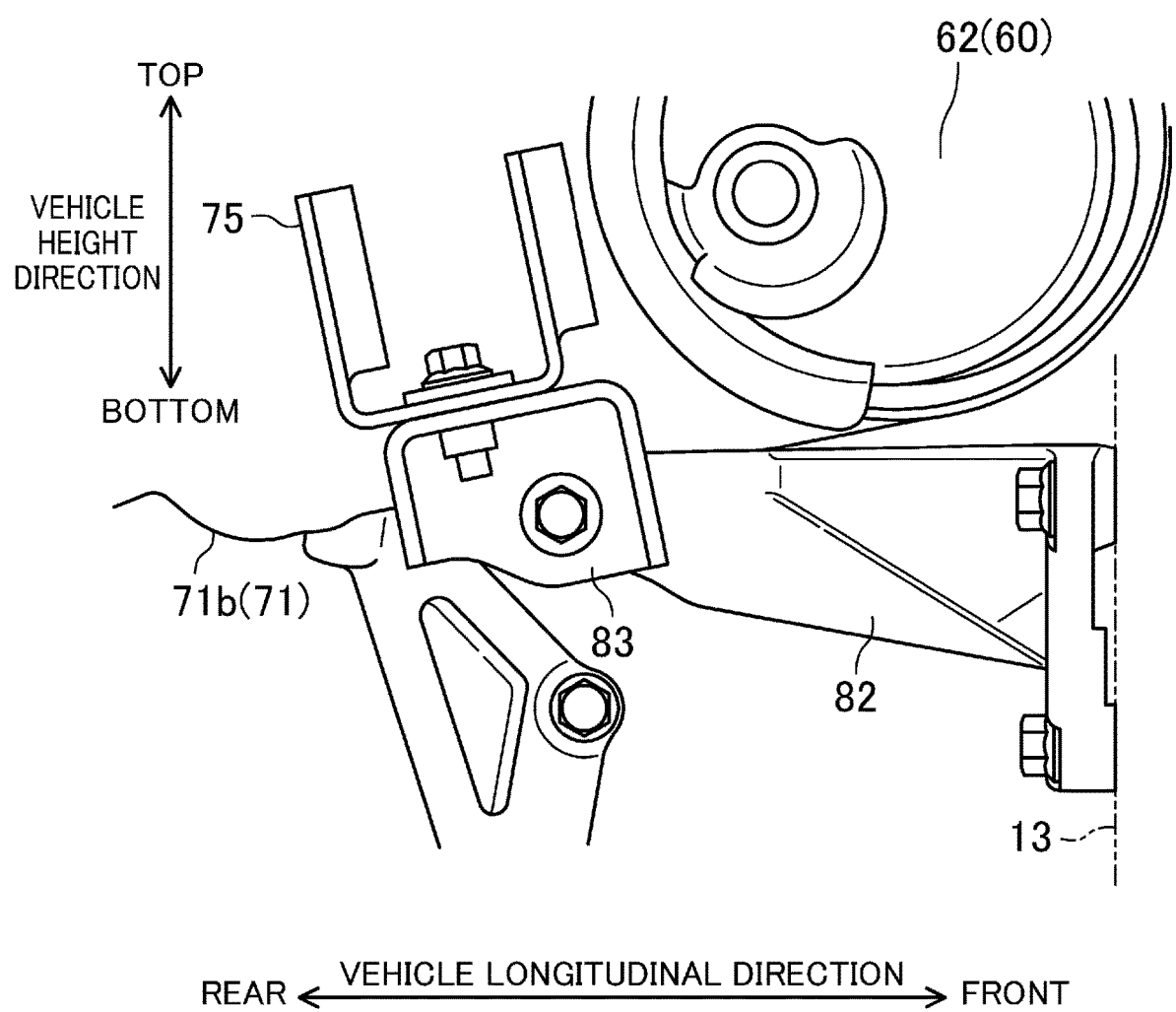
FIG. 13 is a diagram showing a support structure provided by a second support as viewed from the right.

FIG. 4 is a perspective view showing an entire configuration of the exhaust passage 50. FIG. 5 is a diagram of the exhaust passage 50 as viewed from behind. FIG. 6 is a diagram showing the exhaust passage 50 as viewed from above. FIG. 7 is a diagram showing the exhaust purification system 70 as viewed from above. FIG. 8 is a cross-sectional view showing an internal structure of the exhaust purification system 70. FIG. 9 is a perspective view showing a first support 74 for the exhaust purification system 70 as viewed diagonally from above. FIG. 10 is a cross-sectional view showing a support structure provided by the first support 74. FIG. 11 is a diagram showing a first attachment member 81 for the first support 74 as viewed from the left. FIG. 12 is a perspective view showing a second support 75 for the exhaust purification system 70 as viewed diagonally from below. FIG. 13 is a diagram showing a support structure provided by the second support 75 as viewed from the right.

The components of the exhaust passage 50 are all coupled to the engine body 10, particularly a rear external surface (one side surface) 14a of the cylinder head 14. As described above, the exhaust passage 50 is configured by a combination of the exhaust manifold 60 and the exhaust purification system 70. In particular, the exhaust purification system 70 is disposed on a side of the cylinder head 14 where the rear external surface 14a is located, i.e., behind the cylinder head 14. The external surface 14a is a side surface through which an exhaust gas flows in the air intake-exhaust direction, i.e., an example "exhaust side surface." The exhaust purification system 70 as an exhaust purifier is disposed near the external surface 14a as the exhaust side surface.

Firstly, a configuration of the exhaust manifold 60 will be described.

As shown in FIG. 5, the exhaust manifold 60 is disposed below an upper end of the cylinder head 14. As shown in FIG. 6, the exhaust manifold 60 is configured as an exhaust duct formed of a metal that has branch passages 61 coupled to the respective cylinders 11 via respective exhaust ports 19, and a merging structure 62 in which the branch passages 61 merge together and which is coupled to the exhaust purification system 70.

The branch passage 61 has an outer shape that is substantially W-shaped as viewed from behind. Specifically, the branch passage 61 has three portions in the cylinder array direction, i.e., a curved portion that protrudes downward (see a section I1), a curved portion that protrudes upward (see a section I2), and a curved portion that protrudes downward again (see a section I3), in that order from left to right (see FIG. 6).

The branch passage 61 also has a first branch passage 61A coupled to the first cylinder 11A, a second branch passage 61B coupled to the second cylinder 11B, a third branch passage 61C coupled to the third cylinder 11C, and a fourth branch passage 61D coupled to the fourth cylinder 11D.

As shown in FIG. 7, the first branch passage 61A extends substantially forward from the external surface 14a of the cylinder head 14 as viewed from above. The second to fourth branch passages 61B to 61D all extend diagonally forward right from the external surface 14a of the cylinder head 14 as viewed from above, and merge with the first branch passage 61A.

The merging structure 62 is located at one end in the cylinder array direction of the branch passage 61 (i.e., closer to the first cylinder 11A, and on the right side in the vehicle transverse direction), extending downward at that location.

Specifically, the merging structure 62 is disposed at substantially the same position as that of the first cylinder 11A in the cylinder array direction, extending downward from a downstream end (rear end) of the first branch passage 61A. Thus, the merging structure 62 extends like a straight pipe in the vertical direction as described above, and has a low-profile shape in the vehicle transverse direction as shown in FIG. 4, for example. As shown in FIG. 8, the merging structure 62 has a passage width W1 in the engine output axis direction, and a passage width W2 in the engine air intake-exhaust direction (that is the same as the vehicle longitudinal direction in this example configuration), the passage width W1 being narrower than the passage width W2. The stiffness of the merging structure 62 is smaller in the horizontal direction than in the vehicle height direction. An upstream end (upper end) of the merging structure 62 is coupled to a downstream end of the branch passage 61. A downstream end (lower end) of the merging structure 62 is open leftward. An upstream end of a casing 71 included in the exhaust purification system 70 is coupled to the downstream end (lower end) of the merging structure 62.

Thus, the merging structure 62 is supported via the branch passage 61 on the cylinder head 14 of the engine 1, and is interposed between the engine 1 and the exhaust purification system 70. The merging structure 62 is formed of a metal, has a low-profile shape in the vehicle transverse direction, and has the aforementioned stiffness, which features collectively allow the merging structure 62 to function as a flat spring extending in substantially the vertical direction. Thus, the merging structure 62 functions as a spring part for allowing the exhaust purification system 70 to act as a dynamic damper. As a result, for example, when the casing 71 of the exhaust purification system 70 shakes or rocks in the vehicle transverse direction, the merging structure 62 applies an elastic force to the upstream end of the casing 71.

Next, a configuration of the exhaust purification system 70 will be described.

Here, the exhaust purification system 70 will be described in terms of a relative positional relationship with the powertrain P, or the vehicle body of the automobile 100. The exhaust purification system 70 is disposed immediately behind the cylinder block 13, and is located at substantially the middle of the engine 1 in the vertical direction, and is slightly displaced from the middle to the left in the vehicle transverse direction (to the right with respect to the entire powertrain P including the transmission 2). Although not shown, the exhaust purification system 70 is disposed so as to coincide with the conduit portion T of the dash panel 103 as viewed from behind the vehicle.

Specifically, the exhaust purification system 70 includes the substantially L-shaped casing 71, and a catalyst converter 72 and the GPF device 73, which are contained in the casing 71.

As shown in FIG. 7, the casing 71 is a substantially L-shaped pipe that has a horizontal side extending in the vehicle transverse direction, and a vertical side extending toward the rear of the automobile 100 (particularly, the front and rear of the letter L are reversed in the vehicle longitudinal direction).

A right end of a portion of the casing 71 corresponding to the horizontal side of the letter L (hereinafter referred to as a "horizontal side portion" and indicted by a reference character "71a") is open to the right. This right end is an upstream end of the casing 71, i.e., an upstream end of the entire exhaust purification system 70, and is directly coupled to the downstream end of the merging structure 62 as described above. The horizontal side portion 71a including the right end (i.e., the upstream end) of the casing 71 is disposed immediately below the exhaust manifold 60 (specifically, the branch passage 61). Meanwhile, a left end of the horizontal side portion 71a is linked to a front end of a portion of the casing 71 corresponding to the vertical side of the letter L (hereinafter referred to as a "vertical side portion" and indicated by a reference character "71b").

As can be seen from FIGS. 5-8, the horizontal side portion 71a has two portions in the cylinder array direction. The downstream one of the two portions that is located on the left (see a section I4) is located directly below a curved portion (see the section I1) of the branch passage 61 that protrudes downward.

Meanwhile, the upstream one of the two portions of the horizontal side portion 71a in the cylinder array direction, that is located on the right (see a section I5), is located directly below a curved portion (see the section I2) of the branch passage 61 that protrudes upward.

Meanwhile, as shown in FIGS. 5, 7, and 8, the vertical side portion 71b of the casing 71 protrudes toward the rear of the automobile 100. A rear end of the vertical side portion 71b is a downstream end of the casing 71, i.e., a downstream end of the entire exhaust purification system 70, is disposed behind the exhaust manifold 60, and is open toward the rear. This opening portion is coupled to an upstream end of an exhaust duct 59. The exhaust duct 59 is extended out from the interior of the engine room R through the above conduit portion T, and is coupled to a muffler (not shown) in the rear of the automobile 100.

As shown in FIG. 8, the catalyst converter 72 is of a two-bed type in which two (upstream and downstream) honeycomb catalysts 72a and 72b are arranged in series and are contained in a catalyst container. The upstream honeycomb catalyst 72a is a honeycomb support that supports a first catalyst. The downstream honeycomb catalyst 72b is a honeycomb support that supports a second catalyst.

The first catalyst is active in an oxidation reaction of an unsaturated high hydrocarbon, such as toluene, at a low temperature compared to the second catalyst. Meanwhile, the second catalyst is active in an oxidation reaction of an unsaturated low hydrocarbon, such as isopentane, at a low temperature compared to the first catalyst.

The two honeycomb catalysts 72a and 72b, which are both formed in the shape of substantially a short tube, are contained in an upstream portion (see the section I5) on the right side of the horizontal side portion 71a of the casing 71. Therefore, the two honeycomb catalysts 72a and 72b are located directly below a curved portion (see the section I2) of the branch passage 61 that protrudes upward. The portion of the branch passage 61 corresponding to the section I2 protrudes upward, and therefore, is proportionately separated upward from the two honeycomb catalysts 72a and 72b (see distances A and B in FIG. 5).

Note that the downstream portion (see the section I4) on the left side of the horizontal side portion 71a is a cavity. Therefore, this cavity portion is located directly below a curved portion (see the section I1) of the branch passage 61 that protrudes downward. The portion of the branch passage 61 corresponding to the section I1 protrudes downward, and therefore, proportionately sinks downward and is closer to the cavity portion.

The GPF device 73 is a filter container containing a catalyst filter 73a. The catalyst filter 73a is a ceramic filter body formed of an inorganic porous material that supports the second catalyst. Although not shown, the catalyst filter 73a has a honeycomb structure including a large number of cells extending in parallel to each other.

The GPF device 73, which is in the shape of substantially a tube, is contained in the vertical side portion 71b of the casing 71. Taking into account the relative positional relationship between the vertical side portion 71b and the exhaust manifold 60, the GPF device 73 is located behind the branch passage 61 and the merging structure 62.

A discharge portion 71c for discharging a combusted gas out of the casing 71 is provided at a portion of the vertical side portion 71b that is located downstream of the GPF device 73. An upstream end 52c of the EGR passage 52 is coupled to the discharge portion 71c.

Next, a support structure of the exhaust purification system 70 will be described.

As shown in FIG. 9, etc., the exhaust purification system 70 is supported via the first and second supports 74 and 75 on the cylinder block 13 of the engine body 10. Note that the first support 74 is an example "support," and the second support 75 is an example "second support."

As shown in FIGS. 4-7, etc., the first support 74 is brazed to an upper external surface at a left corner portion of the casing 71 where the horizontal side portion 71a and the vertical side portion 71b intersect. Thus, a portion of the casing 71 that is located downstream of the first support 74 (an attachment location on the exhaust purification system 70 to a right end of the first support 74) in the flow direction of an exhaust gas is the vertical side portion 71b. As described above, the vertical side portion 71b is configured to extend toward the rear of the automobile 100, i.e., in a direction away from the rear external surface 14a of the cylinder head 14.

Here, the first support 74 is configured to have a smaller support stiffness in a horizontal direction as a first direction (in this example configuration, the vehicle transverse direction) which is a direction parallel to the horizontal plane than in the vehicle height direction.

Specifically, as shown in FIGS. 9-11, the first support 74 is configured as a plate-shaped bracket extending in the vehicle transverse direction, and has a right end (second end) attached to the exhaust purification system 70, and a left end (first end) on the opposite side from the right end and attached to the body. As described above, the first support 74 extends in the horizontal direction as the first direction. Specifically, the right end of the first support 74 is brazed to an upper surface of the casing 71. Meanwhile, a left end of the first support 74 is bolted to an upper surface 81a of the first attachment member 81. The first attachment member 81 is fastened to an upper rear surface of the cylinder block 13. Other parts such as the EGR cooler 53 are also attached to the first attachment member 81.

A bend 74a that is flexurally deformable in the vehicle transverse direction is provided between the right and left ends of the first support 74. Specifically, as shown in FIG. 10, the bend 74a is formed in the shape of an inverted U that protrudes upward at a right portion of the first support 74.

Note that, as shown in FIGS. 4-8, etc., of the casing 71 of the exhaust purification system 70, the vertical side portion 71b which is located downstream of the first support 74 is configured to extend in a direction away from the cylinder head 14 as described above. In the vertical side portion 71b, a hollow cavity portion and the GPF device 73 are disposed serially in the flow direction of an exhaust gas, with the hollow cavity being disposed upstream of the GPF device 73. Thus, the GPF device 73 is disposed further away from the first support 74 than the cavity portion is. The vertical side portion 71b extends in a direction away from the cylinder head 14, particularly the external surface 14a as an exhaust side surface, and in this sense, is an example "tube-shape."

Meanwhile, the second support 75 is configured to limit a vibration in the vehicle height direction of the exhaust purification system 70 (particularly, the casing 71).

Specifically, as shown in FIGS. 4-7, etc., the second support 75 is integrally formed with a right portion of the vertical side portion 71b. Meanwhile, as shown in FIGS. 12 and 13, a second attachment member 82 is also fastened to the upper rear surface of the cylinder block 13. The second attachment member 82 is configured to extend rearward from the upper rear surface of the cylinder block 13. A portion of the horizontal side portion 71*a* that contains the catalyst converter 72 (see the section I5) is mounted on the second attachment member 82, with that portion of the horizontal side portion 71*a* being located above the second attachment member 82. A rear end of the second attachment member 82 is fastened to the second support 75 via a bracket 83. As a result, a vibration in the vehicle height direction of the casing 71 of the exhaust purification system 70 is limited.

As described in detail below, such a configuration allows the exhaust purification system 70 to be utilized as a dynamic damper.

(Configurations of Auxiliary Devices)

A plurality of auxiliary devices configured to be operated by an output of the engine 1 are attached to the engine 1. Of these auxiliary devices, a compressor for air conditioning (hereinafter simply referred to as an "air compressor," which is indicated by a reference character "A") is located below the exhaust purification system 70 in the vehicle height direction, and is allowed to vibrate in the horizontal direction.

Figure 14:
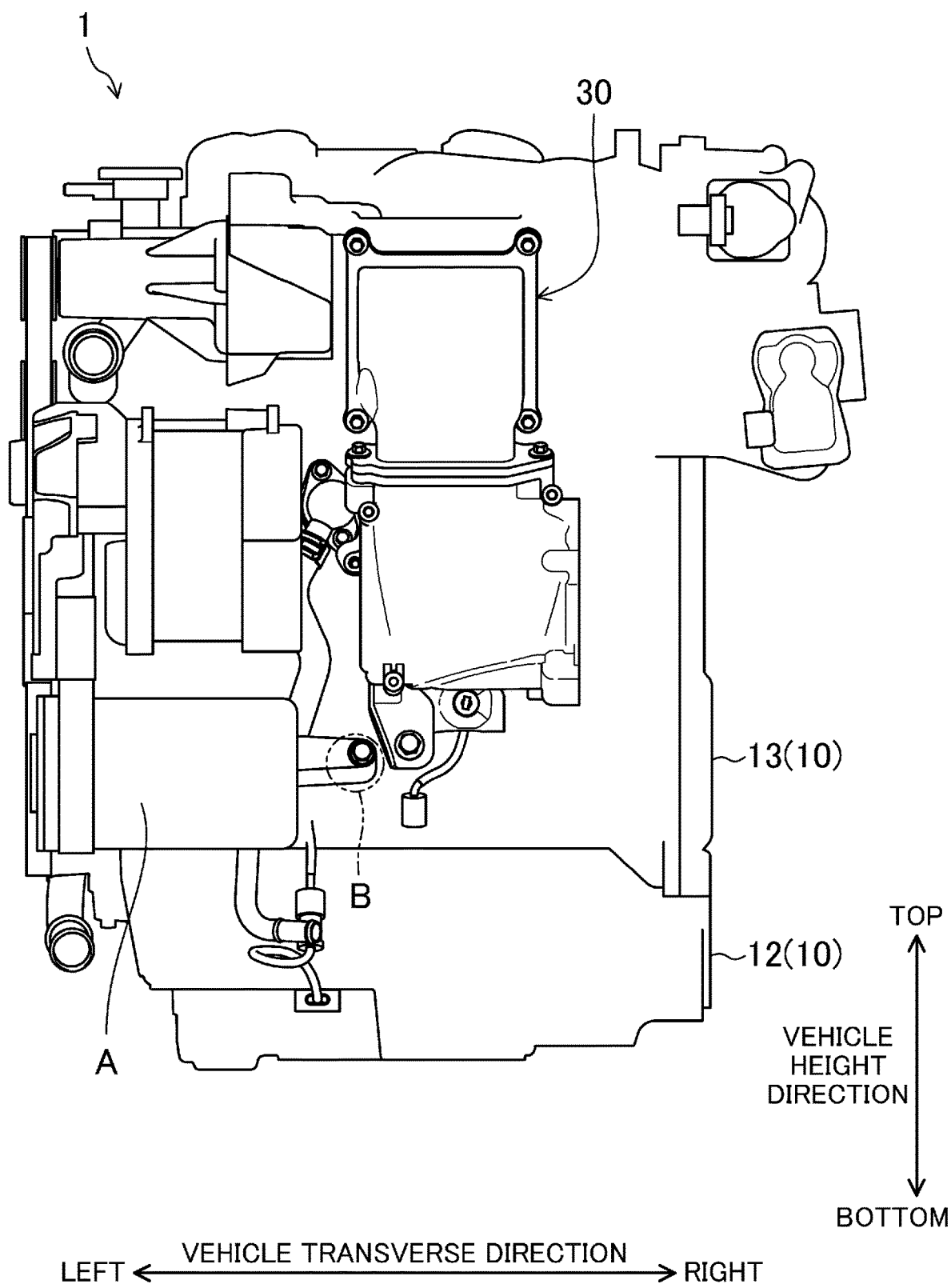
FIG. 14 is a diagram showing an engine as viewed from the front.
Figure 15:
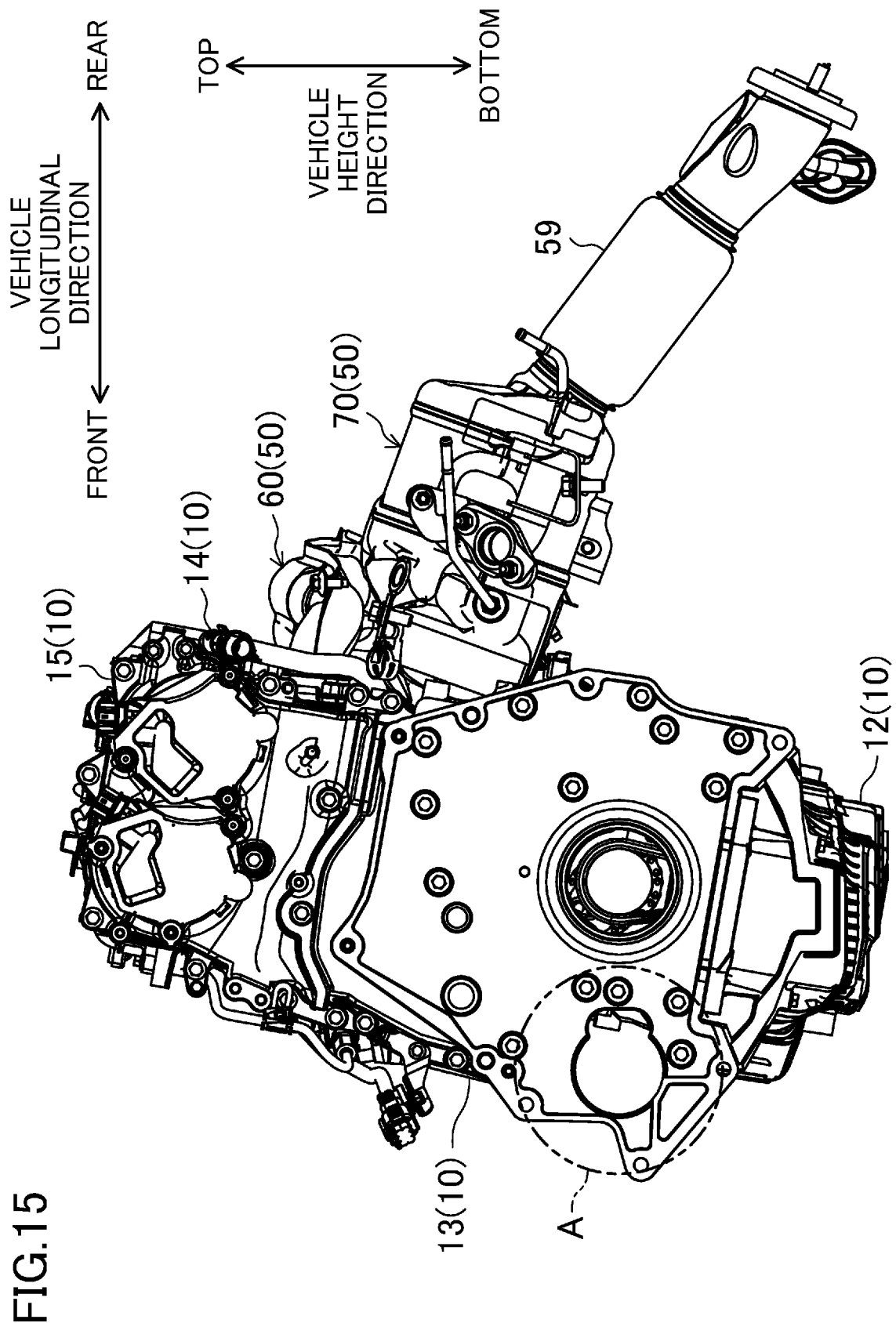
FIG. 15 is a diagram showing an engine as viewed from the left.

Specifically, as shown in FIG. 14, the air compressor A is attached to a lower portion of a front surface of a right end of the cylinder block 13 in the vehicle height direction (more specifically, a portion near the boundary between the cylinder block 13 and the oil pan 12). Therefore, as shown in FIG. 15, the air compressor A is located below the exhaust purification system 70.

A bracket B for attaching the air compressor A to the cylinder block 13 is designed to have a support stiffness that allows the air compressor A to vibrate in the horizontal direction.

(Vibrations Occurring in Powertrain)

Although not shown in detail, a chain cover (not shown) is attached to a left side surface of the engine 1 having the above configuration. The transmission 2 is fastened to the engine 1 with the chain cover being interposed therebetween.

When the engine 1 thus configured starts to operate, a so-called torsional vibration is likely to occur on the horizontal plane, with a portion where the engine 1 and the transmission 2 are fastened together being a node.

Here, the torsional vibration refers to a vibration that is generated by alternate repetition of the motion (see an arrow A1 in FIG. 4) of a portion closer to the transmission 2 of the crankshaft 16 being displaced forward on the horizontal plane while an opposite portion from the transmission 2 of the crankshaft 16 is displaced rearward, and the motion (see an arrow A2 in FIG. 4) of the portion closer to the transmission 2 of the crankshaft 16 being displaced rearward on the horizontal plane while the opposite portion from the transmission 2 of the crankshaft 16 is displaced forward. When the torsional vibration occurs, the powertrain P vibrates with the portion where the engine 1 and the transmission 2 are fastened together being a node.

The present inventors have designed the layout of the exhaust purification system 70 containing the GPF device 73 so as to allow the exhaust purification system 70 to be utilized as a dynamic damper.

Specifically, the exhaust purification system 70 is supported via the first support 74 on the cylinder block 13. In addition, as shown in FIGS. 4-8, etc., the vertical side portion 71*b* of the exhaust purification system 70 is located downstream of the first support 74, extending away from the engine 1. As a result, the exhaust purification system 70 functions as a pendulum, where the vertical side portion 71*b*, which is located downstream of the first support 74, swings with the portion of the vertical side portion 71*b* which is support by the first support 74 being a pivot. This allows the exhaust purification system 70 to be utilized as a dynamic damper.

For example, as shown in FIG. 4, when the crankshaft 16 of the engine 1 is displaced along the arrow A1, the exhaust purification system 70 swings along an arrow B1, and when the crankshaft 16 of the engine 1 is displaced along the arrow A2, the exhaust purification system 70 swings along an arrow B2. Thus, the exhaust purification system 70 functions as a dynamic damper, whereby the above torsional vibration can be cancelled.

A typical powertrain for a vehicle vibrates in various vibration modes during operation. Among the vibration modes is the above torsional vibration that occurs in the horizontal plane with the portion where the engine 1 and the transmission 2 are fastened together being a node.

In order to reduce the torsional vibration, the stiffness of the portion where the engine 1 and the transmission 2 are fastened together may be enhanced by increasing the fastening force of the bolt to that fastening portion, for example.

However, in the above case, the wall thickness of the fastening portion is required to have a great thickness in order to withstand the enhanced fastening force, unfavorably resulting in an increase in the weight of the fastening portion.

In contrast, as shown in FIGS. 9-11, the first support 74 has a support stiffness that is smaller in the horizontal direction than in the vehicle height direction, and therefore, is allowed to undergo flexural deformation in the horizontal direction. As a result, for example, when the torsional vibration occurs, the exhaust purification system 70 (particularly, the vertical side portion 71*b* as a tube-shape) is allowed to swing in the horizontal direction. Therefore, the exhaust purification system 70 can be utilized as a dynamic damper for reducing the torsional vibration.

In particular, as shown in FIG. 10, the first support 74 is provided with the bend 74*a*, which is advantageous in allowing the exhaust purification system 70 to be utilized as a dynamic damper for reducing the torsional vibration.

As shown in FIGS. 12 and 13, the second support 75 reduces a vibration in the vehicle height direction of the exhaust purification system 70. As a result, a vibration that is not necessary for allowing the exhaust purification system 70 to be utilized as a dynamic damper for reducing the torsional vibration, is reduced, which is advantageous in ensuring the durability of the exhaust purification system 70.

As shown in FIGS. 4-8, etc., in the vertical side portion 71*b* extending in a direction away from the external surface 14*a* of the engine 1, the hollow cavity portion and the GPF device 73 are disposed serially, with the hollow cavity portion being located upstream of the GPF device 73. The GPF device 73 is typically configured as a heavy-weight object. Therefore, if the GPF device 73 is disposed downstream of the cavity portion, the moment of inertia of the entire exhaust purification system 70 can be increased. This is advantageous in allowing the exhaust purification system 70 to be utilized as a dynamic damper.

As shown in FIGS. 4-8, etc., the merging structure 62 is supported via the branch passage 61 on the cylinder head 14, and functions as a flat spring interposed between the engine 1 and the exhaust purification system 70. This is advantageous in allowing the exhaust purification system 70 to be utilized as a dynamic damper.

As shown in FIG. 14, the exhaust purification system 70 is disposed above the powertrain P in the height direction (specifically, at a position near the cylinder head 14 of the engine 1). In this case, as described above, when the exhaust purification system 70 is utilized as a dynamic damper, the torsional vibration is reduced in an upper portion of the powertrain P, but the torsional vibration is not likely to be sufficiently reduced in a lower portion of the powertrain P (e.g., a portion extending from the cylinder block 13 to the oil pan 12 of the engine 1).

However, as shown in FIG. 15, not only the exhaust purification system 70, but also the air compressor A attached to the engine 1, are allowed to vibrate in the horizontal direction. In this case, the air compressor A can be utilized as a second dynamic damper. As shown in FIGS. 14 and 15, the air compressor A is located below the exhaust purification system 70, and therefore, the torsional vibration can also be reduced in the lower portion of the powertrain P.

Other Embodiments

In the above embodiment, an example inline four-cylinder engine has been described. The present disclosure is not limited to this configuration. Alternatively, the present disclosure is applicable to an inline six-cylinder engine. The form of the exhaust manifold 60 may be appropriately changed, depending on the number of cylinders. In the above embodiment, the transverse engine 1 has been described. The present disclosure is not limited to this. Alternatively, the present disclosure is applicable to a longitudinal engine.

In the above embodiment, the powertrain P includes a unit body including the engine 1 and the transmission 2. The present disclosure is not limited to this configuration. For example, in the case of a hybrid vehicle (HV), the unit body may include the engine 1, the transmission 2, and a motor for an HV.

In the above embodiment, the exhaust purification system 70 is supported via the first support 74 on the engine 1. The present disclosure is not limited to this configuration. The exhaust purification system 70 is supported on at least either the engine 1 or the transmission 2. When the unit body includes a motor for an HV, the exhaust purification system 70 may be supported on the motor for an HV.

What is claimed is:

1. A powertrain for a vehicle, comprising:
a body including an engine, and a transmission linked to one side of the engine in an engine output axis direction of the engine;
an exhaust purifier disposed on or near an exhaust side surface of the engine; and
a first support having a first end and a second end opposite to the first end, the first end being attached to the body, the first support extending from the first end in a first direction, and the second end being attached to the exhaust purifier at an attachment location on the exhaust purifier,
wherein
the exhaust purifier includes a tube-shape extending in a direction away from the exhaust side surface in an air intake-exhaust direction,
the exhaust purifier is supported via the first support on the body, and a downstream side of the exhaust purifier in an exhaust gas flow direction from the attachment location extends in a direction away from the engine, and
the first support is configured to have a support stiffness smaller in a vehicle horizontal direction than in a vehicle height direction so that the tube-shape is configured to vibrate in the horizontal direction.

2. The powertrain for a vehicle of claim 1, wherein
the first support is configured as a plate-shaped bracket extending in the first direction, and the first direction is the horizontal direction, and
a bend flexurally deformable in the horizontal direction is formed on the first support at a location between the first end and the second end of the first support.

3. The powertrain for a vehicle of claim 1, wherein
the exhaust purifier is supported via a second support on the body, and
the second support is configured to limit vibration of the exhaust purifier in the vehicle height direction.

4. The powertrain for a vehicle of claim 1, including
an output; and
an auxiliary attached to the engine at a location below the exhaust purifier in the vehicle height direction, the auxiliary being configured to be operated by the output,
wherein
the auxiliary is attached to the engine such that the auxiliary is configured to vibrate in the horizontal direction.

5. The powertrain for a vehicle of claim 1, including:
a cavity positioned in the exhaust purifier at a downstream location in the exhaust gas flow direction from the attachment location; and
a purifier serially positioned in the exhaust purifier with respect to the cavity at a location that is downstream from the cavity in the exhaust gas flow direction.

6. The powertrain for a vehicle of claim 1, including:
an exhaust manifold positioned between the exhaust purifier and the engine, the exhaust purifier coupled to the engine by the exhaust manifold,
wherein
the exhaust manifold has branch passages coupled to respective cylinders of the engine, and a merging structure in which the branch passages merge together, and the merging structure is coupled to the exhaust purifier, and
the merging structure is configured to have a stiffness smaller in the horizontal direction than a stiffness in the vehicle height direction.

* * * * *